Jan. 20, 1970     E. E. MALLORY ET AL     3,490,980
TIRE BUILDING APPARATUS
Filed July 22, 1966                                       2 Sheets-Sheet 2
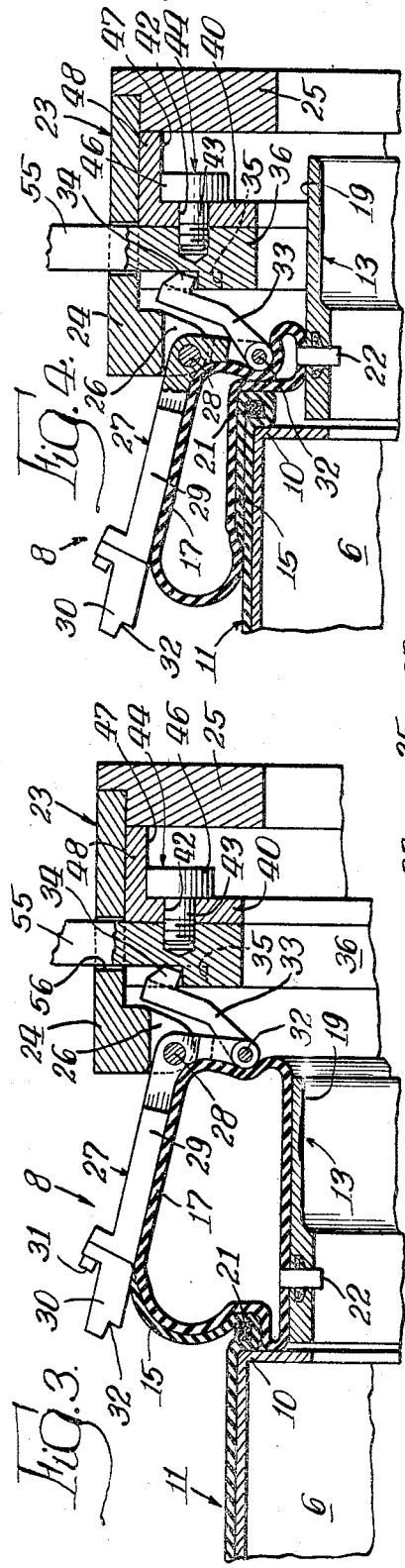
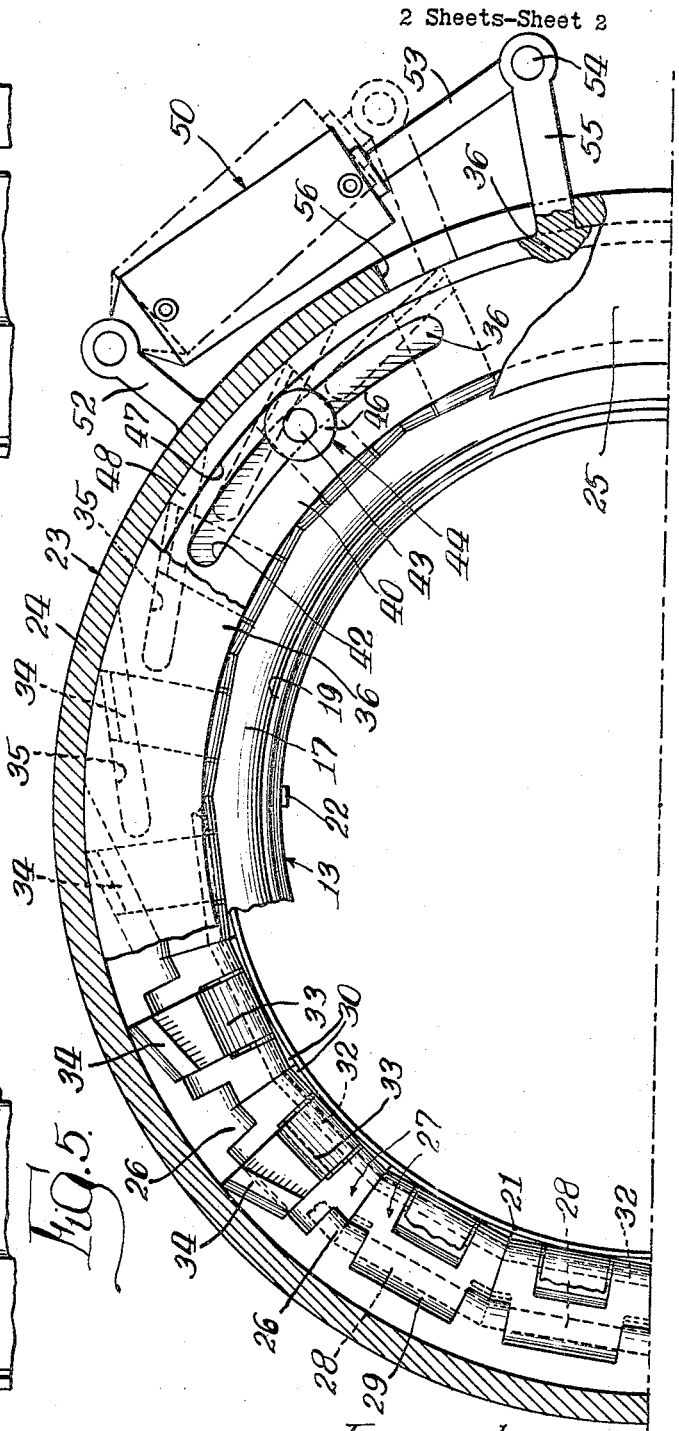
Inventors:-
Edwin E. Mallory,
Larry C. Frazier,
By Orson, Jackson Boettcher of Dienner
Attys

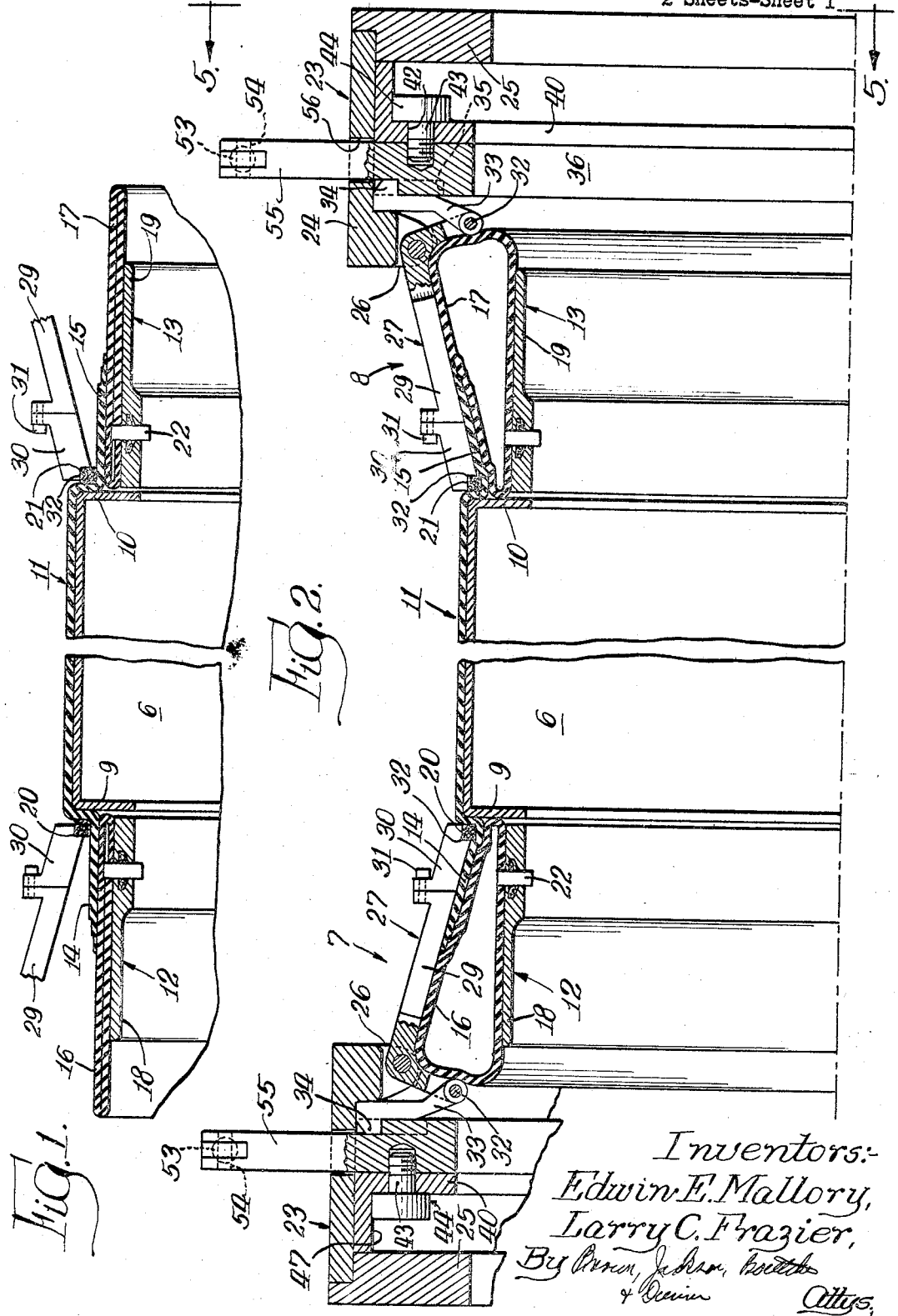

United States Patent Office 3,490,980
Patented Jan. 20, 1970

3,490,980
TIRE BUILDING APPARATUS
Edwin E. Mallory, Niles, Mich., and Larry C. Frazier, Prescott, Ariz., assignors to National-Standard Company, Niles, Mich., a corporation of Delaware
Filed July 22, 1966, Ser. No. 567,275
Int. Cl. B29h 17/12, 17/22
U.S. Cl. 156—401                    7 Claims

ABSTRACT OF THE DISCLOSURE

Tire building apparatus embodying combined tire bead holder and ply turn-up means in which pivoted segment means are provided which in a first position hold tire beads against tire bead shoulders of tire carcass material, and which segment means in a second position and in association with inflatable bag means effect turning up of the ends of tire carcass material to encase the tire beads.

---

The present invention relates to tire building apparatus and is particularly concerned with assembling tire beads with a tire carcass in fabricating a tire.

In the building of tires it is conventional practice to dispose a tire bead inwardly of each of the opposite end portions of tire carcass material supported on the drum, with the tire beads being held in place by adhesion of the gums of the tire carcass material and tire beads. Thereafter, opposite end portions of the tire carcass material are turned over the tire beads and adhered to the portions of the carcass material axially inwardly of the tire beads. This widely employed practice is of a disadvantage especially when, as is frequently the case, tire beads are elliptical rather than of true circular configuration. In such instances, even after application of the tire bead against the shoulder of tire carcass material supported on a drum by a circular bead placing ring, upon removal of the bead placing ring to enable turning-up the end portion of the carcass material over the tire bead, the tire bead will frequently resume its elliptical configuration in that the adhesion of the holding gums is insufficient to retain the tire bead circular or concentric with respect to the drum. Thus, such a tire bead is not properly incorporated in the tire.

The art sought to overcome the disadvantage of the foregoing practice by embodying radially expansible tire bead holding means lying inwardly of the carcass material on an inflatable main drum, and which expansible tire bead holding means are radially outwardly expanded against the inflatable drum to hold the tire beads in predetermined fixed relation around the tire carcass material. In such arrangement of parts an inflatable main drum is highly unsatisfactory in that it does not provide a firm tire building surface. In addition separate mechanisms are provided for making the turn-ups of the ends of the carcass material over the tire beads. This approach to the problem requires separate structures for holding the tire beads and making the turn-ups and adds to the complexity of operation of the tire building apparatus.

It is the purpose of the present invention to provide tire building apparatus embodying combined tire bead holder and turn-up means which serve to retain a tire bead concentric with the building drum until the tire bead is well encased by the carcass material, and after which the turn-up is completed to fully encase the tire bead in the carcass material.

A preferred embodiment of an apparatus of the present invention will now be described in connection with accompanying drawings in which—

FIGURE 1 is a detail longitudinal sectional view of a portion of a tire building machine showing certain components of the present invention;

FIGURE 2 is a longitudinal sectional view of a portion of a tire building machine constructed in accordance with the present invention;

FIGURE 3 is a detail longitudinal sectional view of the right hand end portion of the tire building machine shown in FIGURE 2 illustrating one position of the parts in applying a turn-up around a tire bead;

FIGURE 4 is a view similar to FIGURE 3 but showing the parts in position for completing a turn-up of the tire carcass material around a tire bead; and FIGURE 5 is a view taken substantially along the line 5—5 of FIGURE 2 looking in the direction indicated by the arrows.

Referring now to FIGURES 1 and 2, there is shown a tire building machine comprising a main tire building drum 6 and first and second tire bead holding and turn-up means 7 and 8 disposed at opposite ends of the main drum 6. The main drum 6 may be of any desired and conventional construction to provide, as shown in FIGURES 1 and 2, shoulders 9 and 10, at its opposite ends adjacent the tire bead holding and turn-up means 7 and 8, respectively, serving as tire bead seats. If desired, the drum 6 may embody, as is known, radially inwardly and outwardly movable segments to provide in an inner radial position thereof with drum means 12 and 13 of the tire bead holding and turn-up means 7 and 8, respectively, an initial cylindrical surface for supporting tire carcass material, such as shown at 11, therearound for the carcass of a tire and which main drum 6 may then be expanded radially outwardly to provide shoulders such as 9 and 10. Alternately, if desired, the drum could be of a construction as shown in FIGURES 1 and 2 initially providing shoulders 9 and 10 and about which the tire carcass material is layed with end portions of the tire carcass material as at 14 and 15 for the turn-ups being supported upon drum means 12 and 13 disposed on a common axis with main drum 6 and defined by inflatable bag means 16 and 17 which, in turn, are supported on turn-up flanges 18 and 19, respectively.

After laying of tire carcass material about a main drum 6 and turn-up drums 12 and 13 as shown in FIGURES 1 and 2, the shoulders 9 and 10 provide annular shoulders at opposite ends of the main drum for the tire beads 20 and 21, respectively.

The tire bead holding and turn-up means 7 and 8 are of comparable construction in view of which the following description will be directed to the tire bead holding and turn-up means 8 at the right hand end of the main drum 6 and in which like reference numerals applied to the tire bead holding and turn-up means 7 indicate the same or comparable parts.

The tire bead holding and turn-up means 8 further comprises a port 22 in turn-up drum 19 and provides for admission and release of fluid under pressure, such as air, into and out of the inflatable bag 17 to inflate and deflate the latter as will be below described.

The tire bead holding and turn-up means 8 further includes stationary-against-rotation frame means indicated generally at 23 defined by a cylindrical casing or housing 24 closed at its outer end by a circular plate or end wall 25. A plurality of ears 26 project radially inwardly of the cylindrical member 23 at its inner end and to which each ear member segment means 27 is pivotally mounted as at 28. The segment means 27 are each defined by a first arm member 29 to which a tire bead placing arm 30 is suitably secured as at 31. The inner ends of the bead placing arms 30 are formed with internal annular shoulders 32 which in the position of the parts as shown in FIGURES 1 and 2 define a substantially annular shouldered surface for supporting the tire bead 21 to hold it snug in true circular configuration and concentric with main drum 6 at the bead placing shoulder 10.

The segment means 27 at their outer ends have connection as at 32 to cam members 33 formed at their outer ends, as best seen in FIGURE 5, with cam surfaces 34 having engagement with cam slots 35 formed in a ring member 36 lying within the cylindrical housing 23. The cam slots 35 as best seen in FIGURE 5 extend angularly outwardly so that upon relative rotation of the ring member 36 in opposite directions about the common axis of the main drum and turn-up drums effects generally radially inward and outward movement of the inner ends of the several segment means 27. A second ring member 40 is disposed within the housing 23 and is formed with a plurality of circumferentially spaced apart slots 42, for example, four in number spaced apart 90°, through which pin portions 43 of pin and roller means 44 extend for threading engagement at their inner ends with the ring member 36. The rollers 46 of the pin and roller means 44 engage the inner annular surface 47 of the annular flange 48 of the ring member 40 to thus provide for support of the ring member 36. The slots 42 permit limited relative rotative movement of ring member 36 in clockwise and counterclockwise directions, as viewed in FIGURE 5, to provide inner and outermost end positions of the bead placing and holding segment means 27 for purposes to be described.

In the arrangement of parts in a tire building machine as aforedescribed and with suitable tire carcass material around the main drum 6 and turn-up drums 12 and 13 as shown in FIGURE 1, the ring 36 through the instrumentality of a piston and cylinder assembly 50 provides for position of the several segment means 27 to the positions thereof shown in FIGURES 1 and 2. The piston and cylinder assembly 50 as shown comprises a standard 52 fixed to the outer cylindrical housing 23 and the piston rod 53 of the assembly has pivotal connection as at 54 with a standard 55 fixed to the outer periphery of the ring member 36 to extend outwardly of the circumferentially extending slot 56 formed in the wall of the cylindrical housing 23. The piston and cylinder means 50 is suitably energized to dispose the ring member 36 in the position shown in FIGURE 5 and in which position the several segment means 27 are disposed in the positions thereof shown in FIGURES 1 and 2 to hold the tire beads 19 and 20 in true circular configuration and concentric with the axis of the main drum 6 at the shoulders 9 and 10 thereof. With the parts in the position last noted, air under pressure is admitted through the inlet port 22 into the inflatable bag 17 with expansion of the bag effecting turning up of the tire carcass material at 15 over the tire bead 21 from the position shown in FIGURE 2 to the position shown in FIGURE 3. At this juncture it will be noted that the tire bead has been held in position until a major portion of it, approximately 70% in the illustrated embodiment, has the carcass material applied thereto. In the expansion of the inflatable bag 17 from the position shown in FIGURE 2 to the position shown in FIGURE 3, the piston and cylinder means 50 is actuated to advance the ring 36 in a counterclockwise direction as viewed in FIGURE 5 which through the aforementioned cam means 34 and cam slots 35 effects pivotal movement of the segment means 27 about pivot pins 28 to dispose the inner ends of the segment means 27 radially outwardly to the position shown in FIGURE 3. With the segment means 27 in the position last noted, the frame means 23 is caused to be shifted axially inwardly toward the main drum 6 to the position shown in FIGURE 4 at which the turn-up of the carcass material supported on the inflatable bag 17 is layed over the tire bead and over the adjacent peripheral edge portion of the tire carcass material on the main building drum to fully encase the tire bead. The segment means 27 in the radial outer positions of the inner ends thereof defined a substantially conical surface tapering from the inner ends thereof toward the turn-up drum 19 to provide for the aforementioned movement of the bag means 17 in forming the turn-up. After thus encasing the tire bead the main frame 23 is retracted, the inflatable bag 17 collapsed, and the segment means retracted to a position for the placement of a succeeding bead about succeeding carcass material layed about the main building drum and the turn-up drums and inflatable bags thereon for incorporating tire beads in a succeeding carcass.

The invention claimed is:

1. In a tire building machine having a main tire building drum, the combination of first tire bead holding and turn-up means comprising turn-up drum means including a turn-up drum on a common axis with and at one end of said main drum, inflatable bag means carried by said turn-up drum, said main drum and said turn-up drum means providing for the support thereon of tire carcass material for the carcass of a tire, a stationary frame, a plurality of segment means carried by said frame, means for pivotally supporting said segment means on said frame circumferentially about said common axis to extend axially and over said inflatable bag means and for pivotal movement of said segment means to dispose the axially inner ends thereof in a first position for holding a tire bead concentric with and adjacent said main drum, said inflatable bag means upon admission of fluid under pressure therein initially displacing the carcass material thereon around a major portion of said tire bead with said segment means in said first position, segment moving means for effecting pivoting of said segment means to a second position to displace said inner ends thereof radially outwardly of said tire bead, and said frame means with said segment means in the second radial outer position of said inner ends being movable in a direction axially toward and over said main drum to contact and bias said bag means to turn up the ends of said carcass material on said bag means over said main drum to fully encase said tire bead.

2. The tire building machine of claim 1 characterized by said inner ends of said segment means having notches defining a substantially annular internal annular shoulder for supporting a tire bead therein.

3. The tire building machine of claim 2 characterized by said segment means having inner surfaces defining in the radial outer position of said inner ends of said segment means a substantially conical surface tapering radially inwardly towards said turn-up drum means.

4. The tire building drum of claim 3 characterized by said main drum being radially expansible to form a shoulder lying radially outwardly of and adjacent said turn-up drum providing a seat for tire beads.

5. The tire building drum of claim 4 characterized by second tire bead holding and turn-up means corresponding to said first bead holding and turn-up disposed at the other end of said main drum.

6. The tire building machine of claim 1 in which said segment moving means comprises a first ring member mounted in said frame for turning movement about said common axis, said segment means having cam members at the outer ends thereof, cam slots in said ring member for receiving said cam members, and means for rotating said ring whereby said segment means through said cam members and said cam slots are movable selectively to dispose said inner ends of said segment means in their radial inner or outer positions.

7. The tire building machine of claim 6 characterized by a second ring member for said frame means, a plurality of circumferentially extending spaced apart slots in said second ring member, pin and roller means having pin portions extending through said last named slots and mounted in said first ring member with said rollers in engagement with said second ring members for supporting said first ring member.

References Cited

UNITED STATES PATENTS

| | | | |
|---|---|---|---|
| 3,078,204 | 2/1963 | Appleby | 156—401 X |
| 3,127,294 | 3/1964 | Porter | 156—401 X |
| 3,171,769 | 3/1965 | Henley et al. | 156—403 X |

HAROLD ANSHER, Primary Examiner

C. B. COSBY, Assistant Examiner

U.S. Cl. X.R.

156—132, 403